(12) United States Patent
Baratakke et al.

(10) Patent No.: US 7,804,780 B2
(45) Date of Patent: *Sep. 28, 2010

(54) RECEIVING AND TRANSMITTING DEVICES FOR PROVIDING FRAGMENTATION AT A TRANSPORT LEVEL ALONG A TRANSMISSION PATH

(75) Inventors: Kavitha V. M. Baratakke, Austin, TX (US); Vinit Jain, Austin, TX (US); Kiet H. Lam, Round Rock, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 12/275,689

(22) Filed: Nov. 21, 2008

(65) Prior Publication Data

US 2009/0067325 A1 Mar. 12, 2009

Related U.S. Application Data

(63) Continuation of application No. 10/897,354, filed on Jul. 22, 2004, now Pat. No. 7,474,619.

(51) Int. Cl.
*G01R 31/08* (2006.01)
*H04L 12/28* (2006.01)
*H04J 3/16* (2006.01)
(52) U.S. Cl. .................. 370/235; 370/389; 370/466
(58) Field of Classification Search ............ None
See application file for complete search history.

(56) References Cited

U.S. PATENT DOCUMENTS 5,751,970 A * 5/1998 Bournas .................. 709/236

(Continued)

FOREIGN PATENT DOCUMENTS

CN 1425996 6/2003

(Continued)

OTHER PUBLICATIONS

Jain, et al.; Method, System and Article for Router-Assisted Fast Processing of Packet Termination in Hosts, U.S. Appl. No. 10/703,013, filed Nov. 6, 2003, 26 pages.

(Continued)

*Primary Examiner*—Seema S Rao
*Assistant Examiner*—Christine Duong
(74) *Attorney, Agent, or Firm*—Matthew W. Baca

(57) ABSTRACT

The present invention provides receiving and transmitting devices for providing fragmentation at a transport level along a transmission path. The transmitting device comprises an interface and a control unit coupled to the interface. The control unit is adapted to negotiate a packet size with a remote device. The control unit is also adapted to transmit a data packet of up to the negotiated size. The control unit is further adapted to receive acknowledgments from the remote device associated with one or more fragments, fragmented at the transport-level, of the transmitted data packet. The receiving device comprises an interface and a control unit coupled to the interface. The control unit is adapted to receive two or more fragments of a data packet transmitted by a remote device. The control unit is also adapted to transmit one or more acknowledgments to the remote device based on the received fragments.

7 Claims, 8 Drawing Sheets

U.S. PATENT DOCUMENTS

| | | | | |
|---|---|---|---|---|
| 5,892,753 | A | * | 4/1999 | Badt et al. .................. 370/233 |
| 5,959,974 | A | * | 9/1999 | Badt et al. .................. 370/233 |
| 6,212,190 | B1 | * | 4/2001 | Mulligan .................... 370/400 |
| 7,236,501 | B1 | * | 6/2007 | Lim et al. ................... 370/470 |
| 2002/0141448 | A1 | * | 10/2002 | Matsunaga ................. 370/469 |
| 2003/0048793 | A1 | * | 3/2003 | Pochon et al. .............. 370/401 |
| 2003/0188015 | A1 | * | 10/2003 | Lee et al. ................... 709/238 |
| 2004/0008664 | A1 | * | 1/2004 | Takahashi et al. ........... 370/351 |
| 2004/0071140 | A1 | * | 4/2004 | Jason et al. ................. 370/392 |
| 2004/0095883 | A1 | * | 5/2004 | Chu et al. ................... 370/235 |
| 2004/0218550 | A1 | * | 11/2004 | Kim ........................... 370/254 |
| 2005/0030972 | A1 | * | 2/2005 | Madukkarumukumana et al. ......................... 370/463 |

FOREIGN PATENT DOCUMENTS

| CN | 1426204 | 6/2003 |
|---|---|---|

OTHER PUBLICATIONS

Brown, et al., System and Method of Reducing Data Corruption Due to Recycled IP Identification Numbers, U.S. Appl. No. 10/631,064, filed Jul. 31, 2003, 33 pages.

Brown, et al., Apparatus and Method of Reducing Dataflow Disruption when Detecting Path Maximum Transmission Unit (PMTU), U.S. Appl. No. 10/112,498, filed Mar. 28, 2002, 29 pages.

Thomson Delphion Bulletin, IBM Technical Disclosure Bulletin, vol. 38, Packet Fragmentation by Interface Hardware, Jan. 1995, 1 page.

J. Mogul, et al., Request for Comments No. 1191, Path MTU Discovery, Nov. 1990, 17 pages.

IBM Technical Disclosure Bulletin, Transmission Control Protocol Express; Mar. 1993, pp. 17-20.

Research Disclosure #453113; Design of a Simple Network to Manage Multiple VPNs; Jan. 2002, pp. 96-97.

Brown et al.; Apparatus and Method of Multicasting or Broadcasting Data from One Partition of a Partitioned Computer System to a Plurality of Other Partitions; U.S. Appl. No. 09/773,227, filed on Mar. 1, 2002, 27 pages.

Intel; 82544 Gigabit Ethernet Controllers with Integrated PHY, http://www.intel.com/design/network/products/lan/controllers/82544.htm, Date Unknown, 8 pages.

* cited by examiner

RECEIVING AND TRANSMITTING DEVICES FOR PROVIDING FRAGMENTATION AT A TRANSPORT LEVEL ALONG A TRANSMISSION PATH

CROSS REFERENCE TO RELATED APPLICATION

This is a continuation application of U.S. application Ser. No. 10/897,354 filed Jul. 22, 2004, now U.S. Pat. No. 7,474,619.

BACKGROUND OF THE INVENTION

1. Field of the Invention

The invention generally relates to network communications, and, in particular, to providing segmentation at a transport level along a transmission path.

2. Description of the Related Art

It is generally accepted that for efficient data transfer using an Internet Protocol (IP) connection, the data packet size should be as large as possible. The larger the packets, the lesser the overhead associated with transferring the entire data. However, if a packet is larger than what any given intermediate router along the communication path can process, the packet is fragmented at that link. The fragmentation by the routers along the transmission path occurs at the IP layer.

The maximum size packet that can be handled by the physical network link connected to a system defines the maximum transmission unit (MTU) of that network link. The maximum size packet that can be transferred from a transmitting host to a receiving host without fragmentation is called path maximum transmission unit (PMTU). The PMTU is defined as the minimum of all MTUs along the path from a transmitting host to a receiving host. Thus, when a packet of size less than or equal to the MTU of the path (PMTU) is transmitted, all of the intermediate routers in an IP connection are capable of processing it without requiring any IP fragmentation.

As noted, the fragmentation by the routers along the transmission path occurs at the IP layer. IP layer fragmentation, however, can be inefficient. For example, if a fragmented segment of the originally transmitted data packet is lost along the way, the entire data packet has to be retransmitted because the fragmentation along the transmission path occurs unbeknownst to the sender, and, as such, the sender has no information about individual fragments, including the lost segment.

To reduce the need for fragmenting packets along the transmission path, sending hosts commonly determine the MTU of the entire transmission path (i.e., the PMTU) before sending data. One method of determining the PMTU is described in Request for Comments (RFC) 1191. RFC 1191 describes a procedure in which the transmitting host sends a discovery packet with an instruction that the packet not be fragmented (e.g., the "don't fragment" bit is set). If there is some MTU between the two communicating devices that is too small to pass the packet successfully, then the discovery packet is dropped and a "can't fragment" message is sent back to the transmitting source. For example, if a router along the transmission path has a lower MTU than the size of the discovery packet, the router drops the received packet and thereafter transmits a "can't fragment" message to the transmitting source. In some instances, the router may provide its MTU size to the transmitting source. The "can't fragment" message is sent using Internet Control Message Protocol (ICMP), which is an extension to IP and is used to support packets containing errors, control, and informational messages.

The MTU of the path from the sender to the receiver is the lowest MTU of the various individual links that comprise the path. Thus, if a path includes widely varying MTUs, then the smallest MTU along the path is used as the Maximum Segment Size (MSS) even though the bandwidth may be higher along some portions of the transmission path. Thus, while determining the PMTU before transmitting data may avoid IP fragmentation along the transmission path, such a method may not be desirable because it does not make efficient use of the available bandwidth, as a good portion of the higher bandwidth links along a path maybe heavily under-utilized.

The present invention is directed to addressing, or at least reducing, the effects of, one or more of the problems set forth above.

SUMMARY OF THE INVENTION

In one aspect of the instant invention, a method is provided for providing fragmentation at a transport level along a transmission path. The method comprises receiving a data packet from a first remote device for transmission to a second remote device, wherein the data packet includes a transport-level protocol packet encapsulated in a network-level protocol packet and determining if a size of the received data packet is greater than a maximum transmission unit (MTU) value. The method further comprises performing fragmentation of the data packet at a transport-level protocol into two or more fragments in response to determining that the size of the received data packet is greater than the MTU value and transmitting one or more of the fragments to the second remote device.

In another aspect of the instant invention, an apparatus is provided for providing fragmentation at a transport level along a transmission path. The apparatus comprises an interface communicatively coupled to a control unit. The control unit is adapted to receive a data packet from a first remote device for transmission to a second remote device, wherein the data packet includes a transport-level protocol packet encapsulated in a network-level protocol packet and determine if a size of the received data packet is greater than a maximum transmission unit (MTU) value. The control unit is further adapted to perform fragmentation of the data packet at a transport-level protocol into two or more fragments in response to determining that the size of the received data packet is greater than the MTU value and transmit one or more of the fragments to the second remote device.

In yet another aspect of the instant invention, an article comprising one or more machine-readable storage media containing instructions is provided for providing fragmentation at a transport level along a transmission path. The instructions, when executed, enable a processor to receive a data packet from a first remote device for transmission to a second remote device, wherein the data packet includes a transport-level protocol packet encapsulated in a network-level protocol packet and determine if a size of the received data packet is greater than a maximum transmission unit (MTU) value. The instructions, when executed, further enable the processor to perform fragmentation of the data packet at a transport-level protocol into two or more fragments in response to determining that the size of the received data packet is greater than the MTU value and transmit one or more of the fragments to the second remote device.

In another aspect of the instant invention, a transmitting device is provided for providing fragmentation at a transport level along a transmission path. The transmitting device comprises an interface communicatively coupled to a control unit. The control unit is adapted to negotiate a packet size with a remote device to determine a size of data packets that may be transmitted to the remote device and transmit a data packet of up to the negotiated size, wherein the data packet includes a transport-level protocol packet encapsulated in a network-level protocol packet. The control unit is further adapted to receive acknowledgments from the remote device associated with one or more fragments of the transmitted data packet, wherein the one or more fragments are fragmented at the transport-level protocol.

In another aspect of the instant invention, a receiving device is provided for providing fragmentation at a transport level along a transmission path. The receiving device comprises an interface communicatively coupled to a control unit. The control unit is adapted to receive two or more fragments of a data packet transmitted by a remote device, the data packet including a transport-level protocol packet encapsulated in a network-level protocol packet and transmits one or more acknowledgments to the remote device based on the received fragments, wherein the fragments are fragmented at the transport-level protocol.

BRIEF DESCRIPTION OF THE DRAWINGS

The invention may be understood by reference to the following description taken in conjunction with the accompanying drawings, in which like reference numerals identify like elements.

Figure 1:
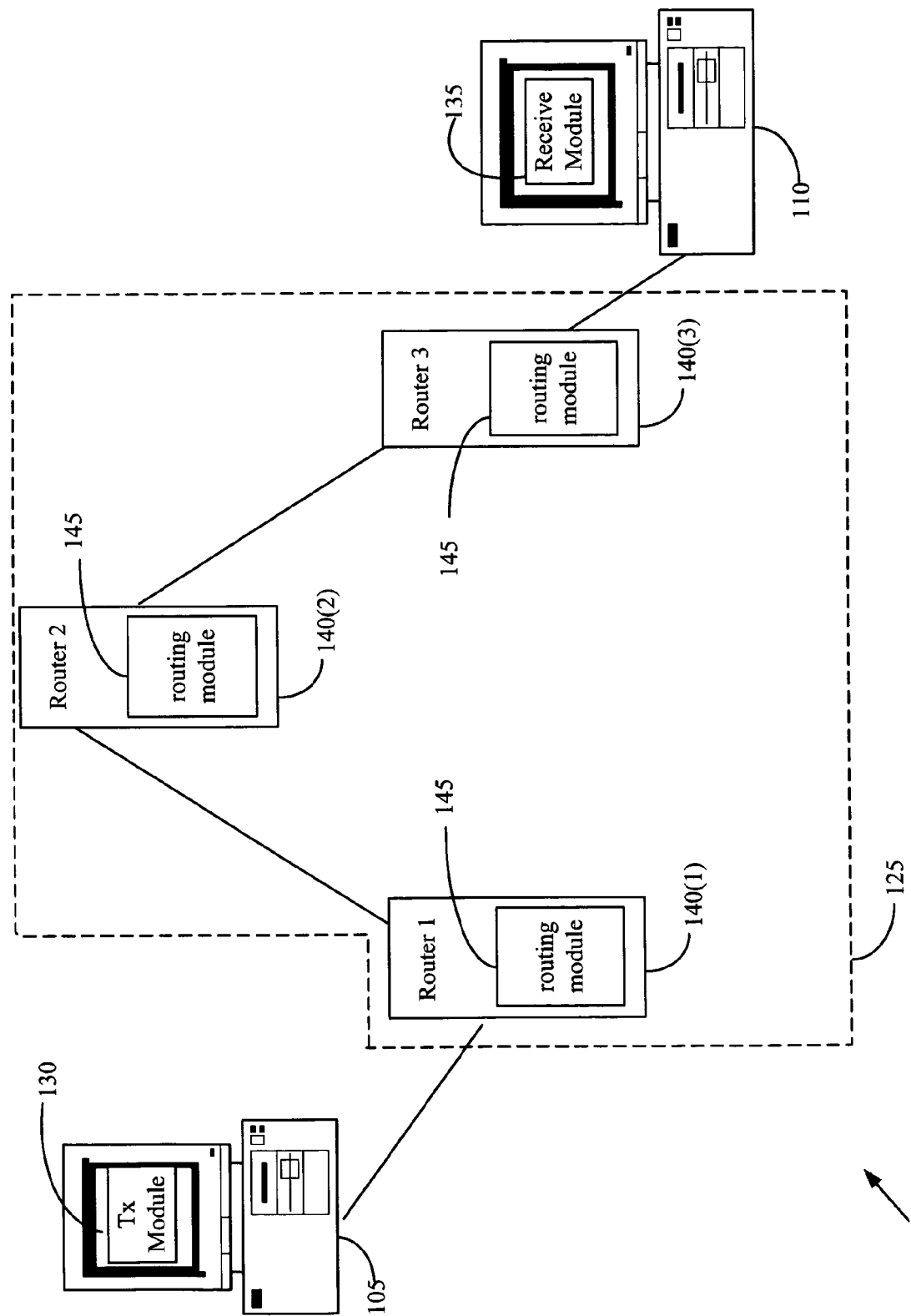
FIG. 1 is a block diagram of an embodiment of a communications system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring to FIG. 1, a communications system 100 is illustrated in accordance with one embodiment of the present invention. The communications system 100 includes a first processor-based host (transmitting host) 105 that is communicatively coupled to a second processor-based host (receiving host) 110 by a network 125, such as by a private network or a public network (e.g., the Internet). In the illustrated embodiment, the first host 105 includes a transmit module 130 (Tx module) for transmitting one or more data packets, and the second host 110 includes a receiving module 135 (Rx module) for receiving the transmitted packets. For illustrative purposes, the host devices 105, 110 are depicted in FIG. 1 to include the respective transmitting module 130 and receiving module 135, although it should be appreciated that in an alternative embodiment, the host devices 105, 110 may each include both modules 130, 135, and thus each may be capable of both transmitting and receiving packets at desired times.

The network 125 may include one or more network devices 140(1-3) (labeled "routers" in the illustrated embodiment) through which the host devices 105, 110 may communicate. The network devices 140(1-3) may, in one embodiment, may be network gateways, network switches, or other devices capable of forwarding received data packets to the intended destination. The number of routers 140(1-3) employed in a given network 125 may vary from one implementation to another. For illustrative purposes, it is herein assumed that the packets sent by the transmitting module 130 traverse through the first router 140(1), the second router 140(2), the third router 140(3) (in that order) before arriving at the receiving module 135. Generally, each router 140 has its own associated MTU threshold (the maximum size packet that the router can process without fragmenting the packet).

The network 125 of FIG. 1 may be a packet-switched data network. In the illustrated embodiment, the network 125 is a data network according to the Internet Protocol/Transport Control Protocol (TCP/IP). Thus, although not so limited, in the illustrated embodiment, the network-layer protocol is IP, and the transport-layer protocol is TCP. Examples of the network 125 may include local area networks (LANs), wide area networks (WANs), intranets, and the Internet. One version of IP is described in Request for Comments (RFC) 791, entitled "Internet Protocol," dated September 1981, and a version of TCP is described in RFC 793, entitled "Transmission Control Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks and the like.

The routers 140(1-3), in the illustrated embodiment, include a routing module 145 that processes data packets sent by the transmitting module 130 in accordance with one embodiment of the present invention. Generally, and as described in greater detail below, the routing module 145 of a given router 140, upon receiving a data packet that originates from the transmitting host 105, determines if the size of the data packet exceeds the MTU value of that router 140. And, if the size of the data packet exceeds the MTU value, the routing module 145 fragments the data packet at the transport level (e.g., TCP protocol layer), as opposed to at the network level (e.g., IP protocol layer) and forwards the fragments for delivery to the receiving host 110. In one embodiment, fragmentation at the TCP level may be performed using TCP segmentation offloading, where the TCP fragmentation is performed by an offload adapter instead of the TCP layer. As explained below, by performing TCP fragmentation, the present invention allows for efficient use of the available bandwidth along the high-bandwidth links. Additionally, it may be possible to detect packet loss expeditiously.

When data packets are fragmented at the TCP-level, each fragment will typically have a TCP header associated therewith. In contrast, when data packets are fragmented at the IP-level, the IP fragmentation will typically include one TCP header but the IP header of each packet will contain the fragmentation information (such as the offset of one packet relative to another packet, whether the packet is a last fragment or there are more to come, and the like). Additionally, IP-level fragmented packets are commonly reassembled at the receiving host 110 before delivering it to upper layers, such as TCP. With TCP level fragmentation, there may be little or no reassembly involved. Thus, if a fragment arrives in sequence it can be expeditiously delivered to the higher-level application.

It should be appreciated that the arrangement of the communications system 100 of FIG. 1 is exemplary in nature and that, in alternative embodiments, the network 125 may include any desirable number of routers 140. The hosts 105, 110 may each be any suitable type of processor-based device, such as a desktop computer, laptop computer, a mainframe, a portable device, a kiosk, a Web appliance, and the like.

The various modules 130, 135, and 145, illustrated in FIG. 1 are implemented in software, although in other implementations these modules may also be implemented in hardware or a combination of hardware and software. In one embodiment, each module 130, 135, and 145, may comprise a plurality of modules, with each of the plurality of modules capable of performing one or more desired acts.

Figure 2:
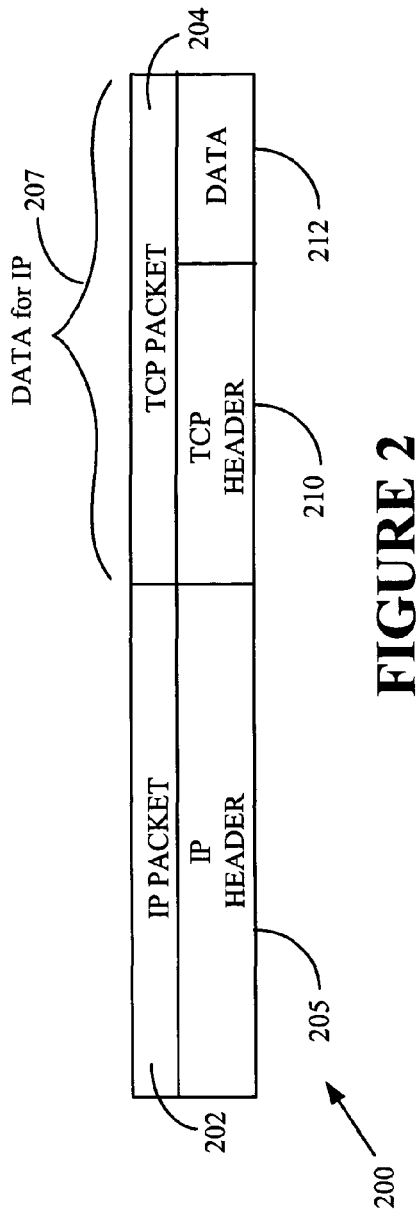
FIG. 2 illustrates a TCP/IP data packet that may be employed in the communications system of FIG. 1, in accordance with one embodiment of the present invention.

The communications system 100 employs the TCP/IP protocol, although other protocols may also be employed in alternative embodiments. For a proper perspective, a representative TCP/IP data packet 200 is shown in FIG. 2 in which a TCP packet is encapsulated in an IP packet. The data packet includes an IP packet 202 and a TCP packet 204. The IP packet 202 includes an IP header 205 and IP data portion 207 (contains payload), and the TCP packet 204 includes a TCP header 210 and a TCP data portion 212 (contains payload). One embodiment of the IP header 205 is shown in FIG. 3, and one embodiment of the TCP header 205 is shown in FIG. 4.

Figure 3:
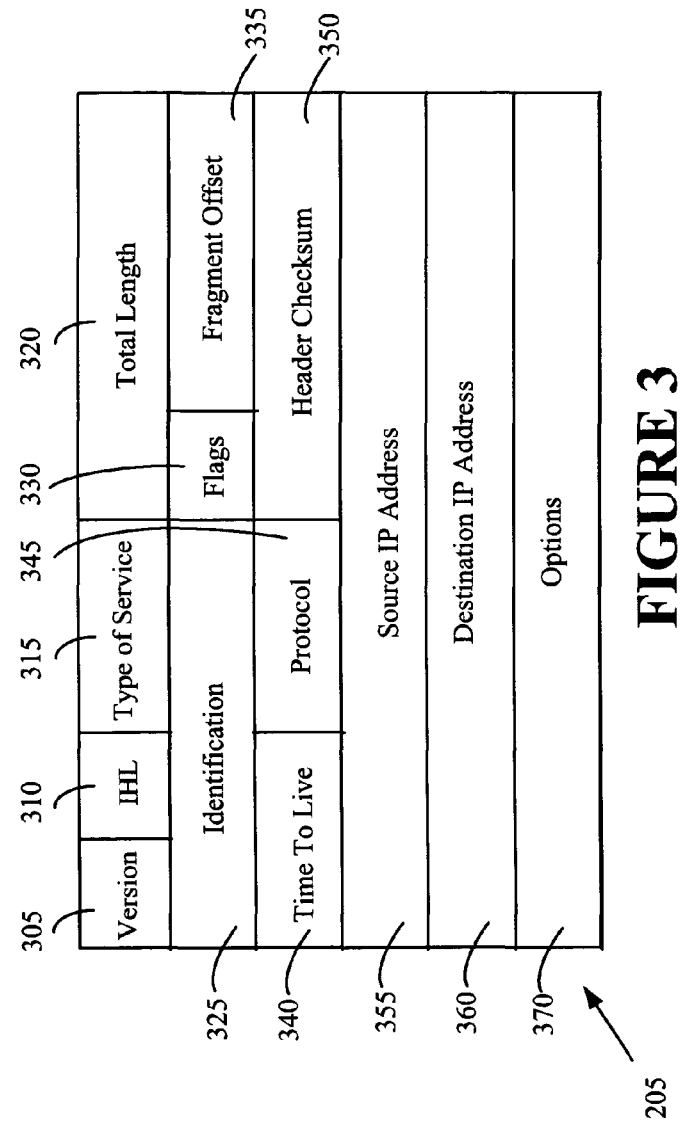
FIG. 3 depicts an IP header of the TCP/IP data packet of FIG. 2.

FIG. 3 depicts various fields of the IP header 205 of the illustrated embodiment. The IP header 205 includes a version field 305 that indicates the version of IP associated with the data packet 202 (see FIG. 2). An IP header length (IHL) field 310 indicates the length of the header. A type-of-service field 315 specifies how a current data packet should be handled by an upper-layer protocol. Each data packet can be assigned a level of importance. A total length field 320 specifies the length of the entire IP packet 202, including the header 205 and the data portion 207. An identification field 325 contains an integer that identifies the current data packet. This field is used to help piece together data packet fragments. A flag field 330, which in the illustrated embodiment is a 3-bit field, is used for fragmentation and re-assembly. The low-order (first) bit is called "more fragments" (MF) bit, and is used to indicate the last fragment of a packet so that the receiver knows that the packet can be re-assembled. The second bit is the "do not fragment" (DF) bit, which suppresses fragmentation. The third or high-order bit is not used.

The IP header 205 includes a fragment offset field 335 that indicates the position of the fragment's data relative to the beginning of the data in the original data packet, which allows the destination IP process to properly reconstruct the original data packet. A time-to-live field 340 maintains a counter that gradually decrements down to zero, at which point the data packet is discarded. This keeps packets from looping endlessly. A protocol field 345 indicates which upper-layer protocol receives incoming packets after IP processing is complete. A header checksum field 350 aids in ensuring the integrity of the IP header 205. The IP header 205 includes a source IP address field 355 that specifies a sending node (e.g., host 105), and a destination IP address field 360 that specifies a receiving node (e.g., host 110). An options field 370 allows IP to support various options, such as security.

Figure 4:
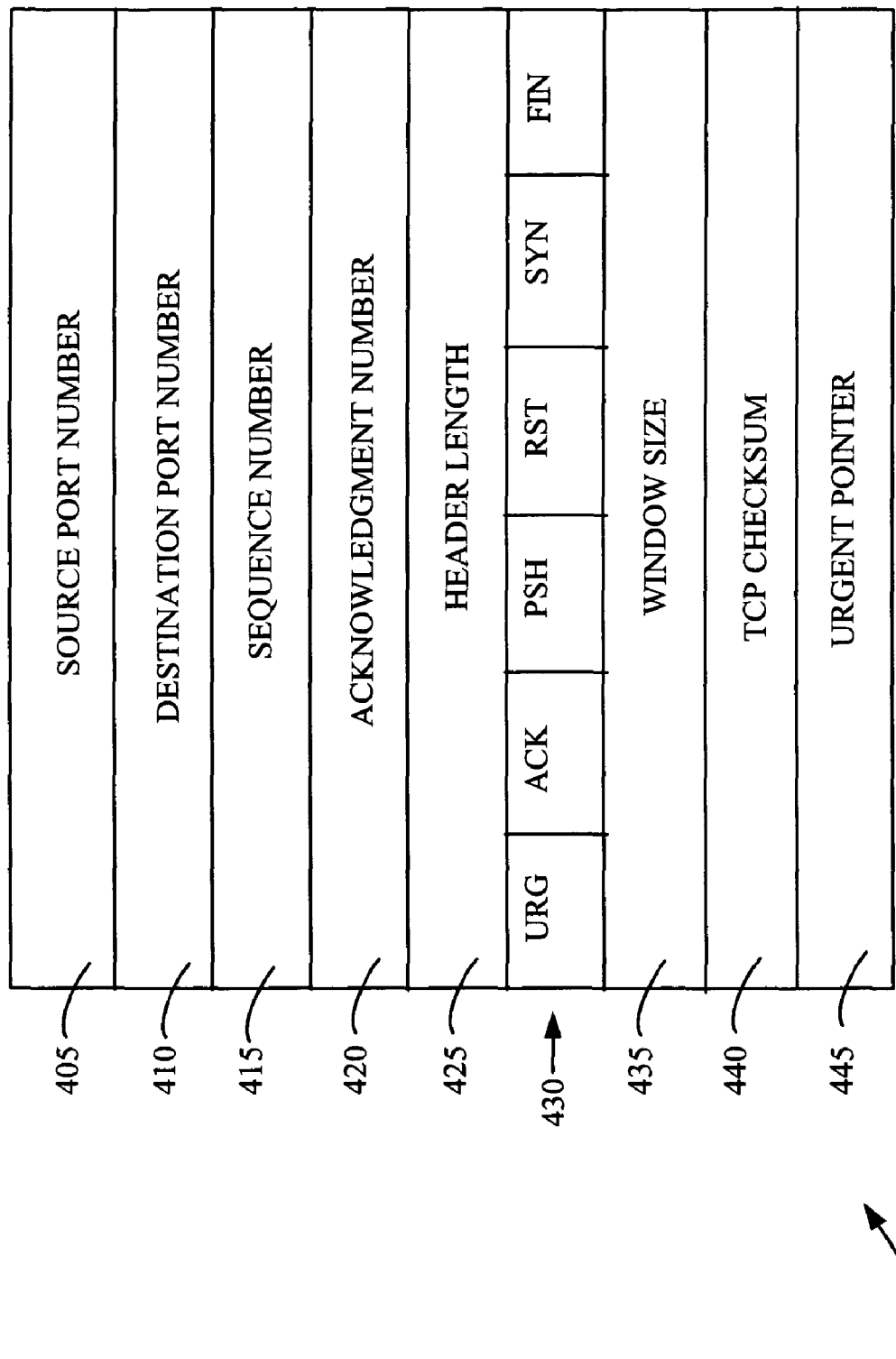
FIG. 4 illustrates a TCP header of the TCP/IP data packet of FIG. 2.

FIG. 4 depicts the TCP header 210 of FIG. 2. A source port number field 405 and a destination port number field 410 are employed to keep track of different conversations. For example, if a server is communicating with three different clients, the server uses a particular port number to communicate with each one of the clients. Thus, the values stored in the source port number field 405 and destination port number field 410 in conjunction with the IP address and the IP header 205 identify a unique connection. This unique connection is often referred to as a socket.

The TCP header 210 includes a sequence number field 415 that is employed to inform the receiving host 110 of a particular packet in the stream of packets. This sequence number field 415 is also employed by the receiving host 110 to notify the sending host 105 that all data packets up to a certain number have been received. The TCP header 210 includes an acknowledgement number field 420 that contains the sequence number of the next byte of data the sender of the packet expects to receive. A header length field 425 indicates the size of the TCP header 210.

The TCP header 210 includes a plurality of flag fields 430 for carrying a variety of control information, including the SYN and ACK flags used for connection establishment, the FIN flag used for connection termination, URG field to indicate that the urgent pointer field 445 (discussed below) has valid information, the PSH flag to instruct the receiving host 110 to pass the data received thus far immediately to a higher-level application, and the RST flag to inform the receiving host 110 to re-establish connection.

The TCP header 210 includes a window-size field 435 that specifies the size of the sender's receive window (that is, the buffer space available for incoming data). A TCP checksum field 440 ensures that the TCP header 210 (and the associated data) have not been modified (or corrupted) in transmit. If the checksum is invalid, the receiving host 110 will not acknowledge the message. The urgent pointer field 445 points to the end of data field that is considered urgent and requires immediate attention. This field is not valid if the URG flag is not set.

The transmitting module 130 of the host 105 of FIG. 1 may, if desired, perform PMTU discovery. The discovery may include transmitting a packet that has a maximum size of the lesser of the local MTU or the maximum segment size (MSS) assigned by the remote system, such as the receiving host 110. The discovery packets are sent with the DF bit set (see flags field 330 of FIG. 3). If there is some MTU between the two host devices 105, 110 that is less than the size of the transmitted packet, then a "can't fragment" message is sent back to the source (in this case the transmitting host 105). The transmitting host 105 thus knows to decrease the size of the packets.

Figure 5:
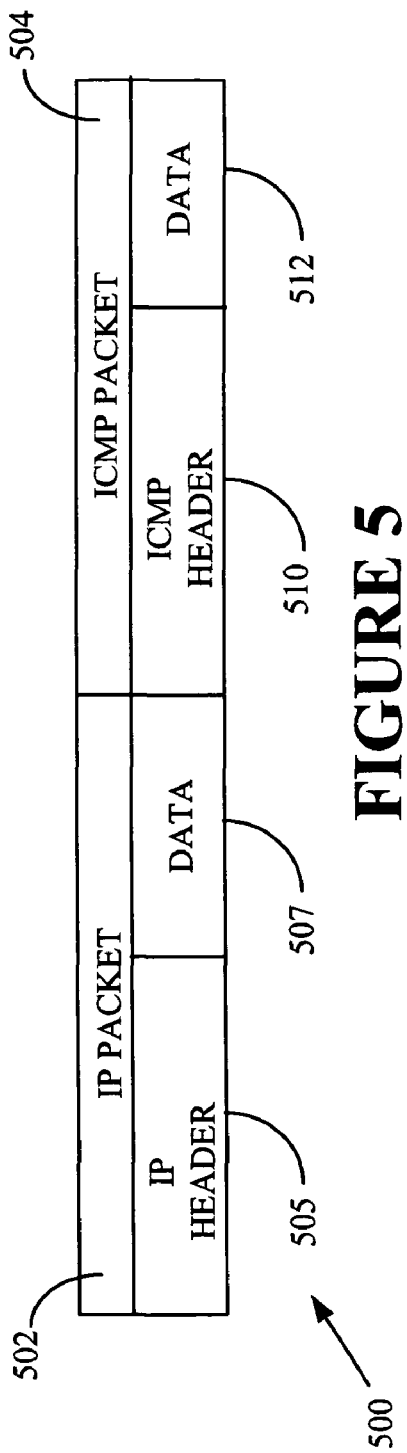
FIG. 5 depicts an ICMP data packet.

The "can't fragment" message, in the illustrated embodiment, is sent using the Internet control message protocol (ICMP), which is an extension to IP and is utilized to support packet containing errors, control, and informational messages. FIG. 5 illustrates a representative IP/ICMP data packet 500. The ICMP data packet 500 includes an IP packet 502 and an ICMP packet 504. The IP packet 502 includes an IP header 505, and an associated data portion 507 and the ICMP packet 502 includes an ICMP header 510 and an associated data portion 512.

Figure 6:
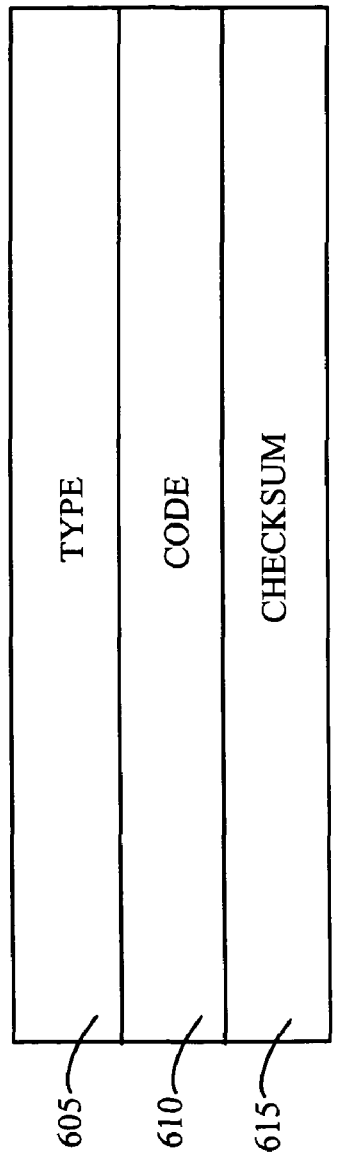
FIG. 6 illustrates an ICMP header of the ICMP data packet of FIG. 5.

FIG. 6 illustrates a format of the ICMP header 510 of the ICMP data packet 500 that may be transmitted by the routing module 145 of the routers 140(1-3) (see FIG. 1). The ICMP header 510 includes a "type" field 605, which can have a value from zero (0) to 256, representing a kind of classification for grouping a "class" of communication types together. A code field 610 specifies various types of messages that fit into the classification of the types defined in the type field 605. For example, a value of three (3) in the type field 605 indicates that the destination of the discovery packet is unreachable, and a value of four (4) in the code field 610 indicates that fragmentation is needed but the "do not fragment" flag is set. When a type 3, code 4 ICMP 504 packet is received by the transmitting host 105, it indicates to the transmitting host 105 that the discovery packet was dropped by the router 140 that sent the ICMP packet 500. A checksum field 615 allows the remote device (e.g., host 105) to verify the integrity of an incoming ICMP packet 504. The ICMP packet 504 is loaded with a predefined number in the checksum field 615, and then when the checksum is computed, the checksum is written over the previous value.

Figure 7:
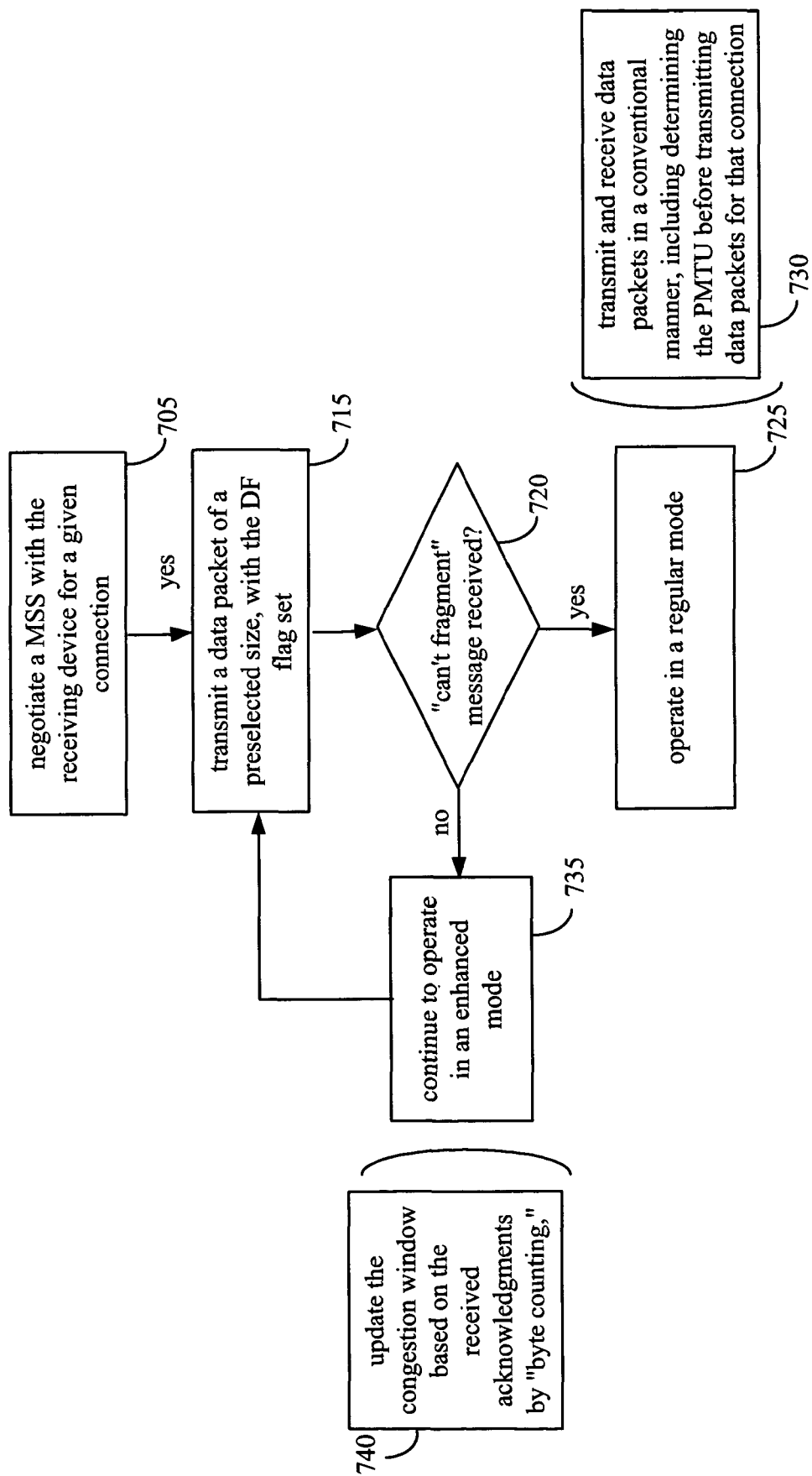
FIG. 7 illustrates a flow diagram of a transmitting module that may be implemented in the communications system of FIG. 1, in accordance with one embodiment of the present invention.

A flow diagram of one aspect of the transmitting module 130 of FIG. 1 is illustrated in FIG. 7, in accordance with the present invention. Generally, and as discussed below, the transmitting module 130 operates in two modes, in a "regular" mode and an "enhanced mode." The transmitting module 130 operates in the "regular" mode to support communications with legacy (i.e., conventional) routers that may not include the routing module 145 of the present invention. In the "regular" mode, the transmitting module 130 operates in a conventional manner where, for example, discovery path MTU may be determined before transmitting data packets that are the size of the PMTU. In the "enhanced" mode, the transmitting module 130 need not determine the PMTU, but rather transmit data packets at a size of up to the negotiated MSS value. In the illustrated embodiment, the transmitting module 130 initially begins in the "enhanced" mode.

The transmitting module 130 negotiates (at 705) a maximum segment size (MSS) with the receiving module 135 for a given communication session. The MSS value specifies the maximum amount of TCP data that a local system (e.g., the host device 105, router 140) can send in a segment. The MSS may be negotiated, for example, during a handshaking session between the two modules 130, 135. The transmit module 130 transmits (at 710) a data packet of a preselected size for delivery to the receiving module 135 of the host 110. In the illustrated embodiment, the preselected size equals the MSS value. In one embodiment, the data packet that is transmitted (at 710) is sent with the "don't fragment" flag set in the flag field 330 of the IP header 205 of FIG. 2). The DF flag may be set to prevent other intermediate routers 140 from fragmenting the data packet (at the IP level) when such fragmentation is not desired. In one embodiment, it may not be desirable to fragment a data packet, for example, to allow the routing module 145 to perform fragmentation at the TCP level, as discussed below.

The transmitting module 130 determines (at 720) if a "can't fragment" message is received from any of the routers 140(1-3) in the transmission path. In one embodiment, such a message may be transmitted using the ICMP packet 500 (see FIG. 5). A "can't fragment" message may be transmitted, for example, by a conventional router that cannot fragment the data packet transmitted (at 715) because the DF flag is set and because the size of that data packet exceeds the MTU value of that router. If it is determined (at 720) that a "can't fragment" message is received (an indication that a conventional router may be in the transmission path), the transmitting module 130 operates (at 725) in the "regular" mode. In this mode, the transmitting module 130 may transmit and receive (at 730) data packets in a conventional manner, including determining the PMTU before transmitting data packets for that connection.

If it is determined (at 720) that a "can't fragment" message is not received (an indication that the PMTU of the routers is larger than the transmitted data packet (at 715) or that the intermediate routers 140 are capable of fragmenting at the TCP level in accordance with the present invention), the transmitting module 130 continues to operate (at 735) in the "enhanced" mode. In this mode, the transmitting module 130 may continue to transmit data packets (at 715) of the preselected size (the MSS size, for example), as opposed to transmitting data packets that are limited in size by the PMTU. In some instances, as described below, the transmitted data packets (at 715) may be fragmented by the routers 140(1-3) at the TCP level. These fragments may arrive at the receiving host 110 at different times, and, as such, the receiving module 135 may transmit acknowledgments for individual fragments (as opposed to one acknowledgement for the entire data packet). Because acknowledgements covering one or more individual segments may be received by the host 105, the transmitting module 130 should be capable of handling multiple acknowledgments associated with the originally transmitted data packet. For this reason, it may be desirable for the transmitting module 130 to update (at 740) its congestion window based on the received acknowledgements by "byte counting," as described in the RFC 3465, entitled "TCP Congestion Control With Appropriate Byte Counting." That is, instead of adjusting the congestion window based on incrementing by an MSS value (e.g., the size of the transmitted data packet), the transmitting module 130, in one embodiment, adjusts the congestion window based on the number of bytes acknowledged by the receiving host 110.

Figure 8:
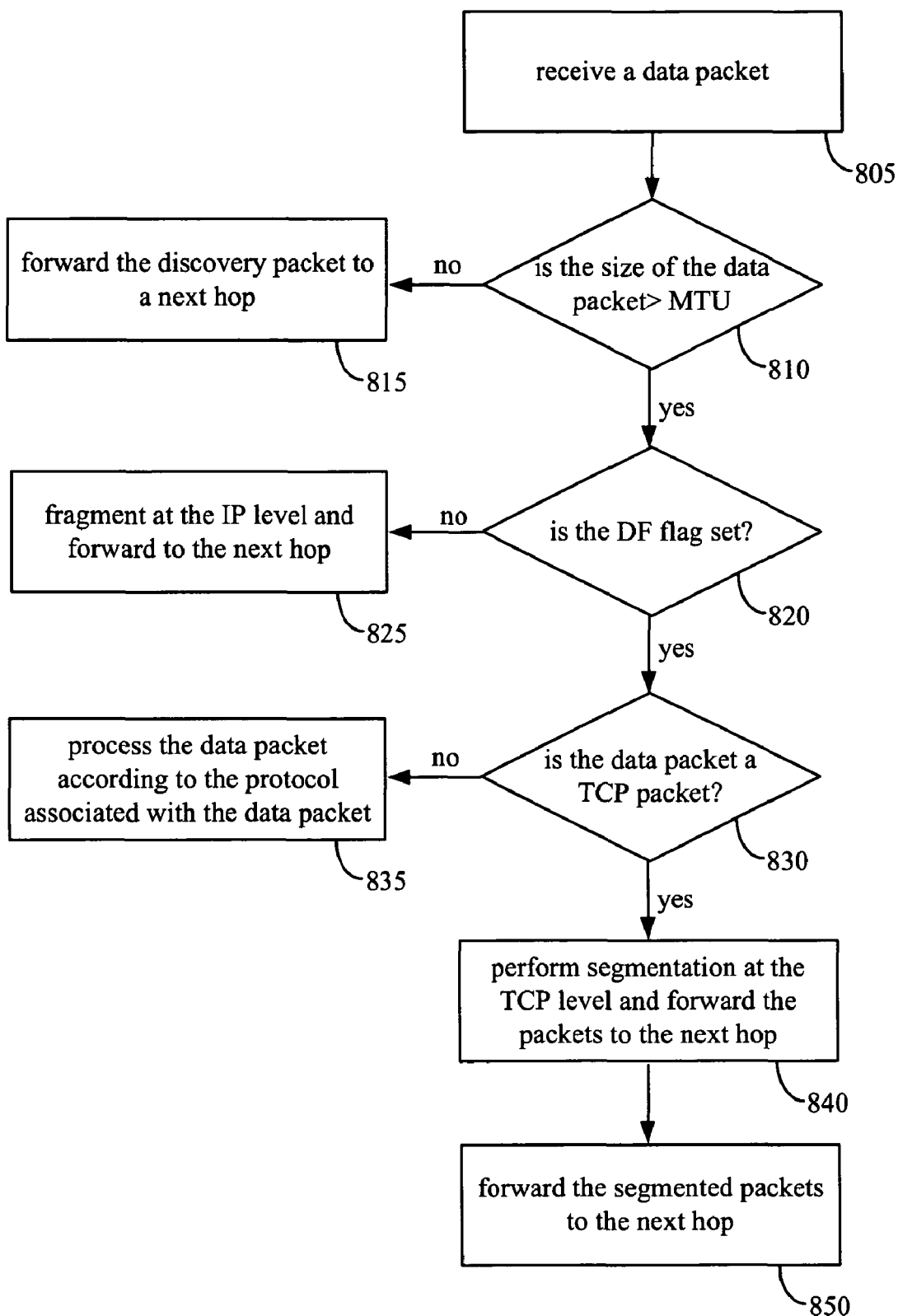
FIG. 8 illustrates a flow diagram of a routing module that may be implemented in the communications system of FIG. 1, in accordance with one embodiment of the present invention.

A flow diagram of one embodiment of the routing module 145 of FIG. 1 is illustrated in FIG. 8, in accordance with the present invention. As described below, the routing module 145 allows the transmitting host 105, for a given connection, to transmit data packets of a size up to the negotiated MSS value, even though the negotiated MSS may be greater than the PMTU for that connection or communications session. For illustrative purposes, it is herein assumed that the transmitting host 105 and receiving host 110 a MSS of 9000 bytes, and that the transmit host 105 sends data packets (with the DF flag set) to the receiving host 110 of the MSS size (i.e., 9000 bytes in this example). For ease of illustration, it is also herein assumed that the path between the transmitting host 105 and the receiving host 110 includes the first, second, and third routers 140(1-3), where the first and second routers 140(1-2) have an MTU of 9000 bytes and the third router 140(3) has an MTU of 1500 bytes. Of course, the MTU sizes supported by the routers 140(1-3) or other network devices may vary from one implementation to another, and it should be appreciated that the exemplary values utilized herein are for illustrative purposes only.

The routing module 145 of the first router 140(1) receives (at 805) the data packet transmitted by the host 105. As noted, in the illustrated example, the size of the data packet is 9000 bytes, which is also the negotiated MSS value between the hosts 105, 110. In one embodiment, the data packet may take the form of the TCP/IP data packet 200 shown in FIG. 2. The routing module 145 determines (at 810) if the size of the data packet is greater than the MTU supported by the first router 140(1) for the outgoing interface. If the discovery data packet is not greater than the MTU (an indication that the received packet can be handled by the first router 140(1) without fragmentation), the routing module 145 forwards (at 815) the discovery packet to a next hop. The next hop in the illustrated example is the second router 140(2), the next router in the path. In other embodiments, the next hop may be any neighboring network device (including a network gateway, switch, router, or even the ultimate destination device, such as the receiving host 110).

In the illustrated example, as noted, the MTU of the first router 140(1) is 9000 bytes, and the size of the data packet is also 9000 bytes. Thus, in this case, the size of the received data packet is not greater than the MTU of the first router 140(1). As such, the first router 140(1) forwards (at 815) the data packet to the second router 140(2).

The routing module 145 of the second router 140(2) receives (at 805) the data packet forwarded by the first router 140(1), and determines (at 810) if the size of this packet exceeds its MTU for the outgoing path. Because the MTU of the second router 140(2) (assumed to be 9000 bytes in this example) is not less than the size of the received data packet, the second router 140(1) forwards (at 815) the 9000-byte data packet to the next hop, which is the third router 140(3), in this example.

The routing module 145 of the third router 140(3) receives (at 805) the data packet forwarded by the second router 140 (2), and determines (at 810) if the size of this packet exceeds its outgoing MTU. Because the MTU of the third router 140(3) (assumed to be 1500 bytes in this example) is less than the size received data packet, the routing module 145 of the third router 140(3) determines (at 820) if the "don't fragment" flag is set in the flags field 330 (see FIG. 3) of the data packet. If the "don't fragment" flag is not set, the routing module 145 may, in one embodiment, fragment (at 825) the data packet at the IP level using conventional, well-known techniques.

If it is determined (at 820) that the "don't fragment" flag is set, the routing module 145 of the third router 140(3) determines (at 830) if the received data packet includes a TCP packet. This may be determined by checking the protocol field 345 (see FIG. 3) of the IP header 205. If the data packet does not include a TCP packet, the received data packet is processed (at 835) according to the protocol specified in the protocol field 345. If the data packet includes a TCP packet, the routing module 145 of the third router 140(3) performs (at 840) fragmentation (or segmentation) at the TCP level. TCP segmentation is well-known to those skilled in the art, and thus is not discussed in detail herein. In one embodiment, the TCP-level segmentation may be performed using TCP segmentation offloading, where an offload adapter (instead of the TCP layer) performs the segmentation. TCP segmentation offloading can be an efficient technique because a lower-layer protocol (at the physical layer, for example) can process the data packet. Thus, in one embodiment, TCP segmentation may be performed by a network adapter. TCP segmentation offloading is well-known to those skilled in the art, and, as such, is not described in detail herein.

As noted, in the illustrated example, the size of the incoming data packet is 9000 bytes, and the MTU of the third router 140(3) is assumed to be 1500 bytes. To perform TCP-level segmentation (at 840), the routing module 145 of the third router 140(3) may fragment the 9000-byte data packet, for example, into seven 1460-byte fragments. Of course, in other embodiments, the data packet may be fragmented in other sizes as well. TCP segmentation may involve, among other things, calculating the checksum value stored in the checksum field 440 (see FIG. 4) of the TCP header 210 for each segment, adjusting the length value stored in the total length field 320 (see FIG. 3) of the IP header 205 for each segment, and the like. Similarly, other appropriate fields of the IP header 205 and TCP header 210 may be modified to make the fragments (or segments) comport with the IP and TCP protocol rules.

The routing module 145 of the third router 140(3) forwards the segmented packets (at 850) to the next hop, which in the illustrated embodiment is the receiving host 110. The receiving host 110, upon successfully receiving a segment of the transmitted data packet, sends an acknowledgment to the transmitting host 105 for that received segment. The manner in which the transmitting module 130 of the host 105 can handle multiple acknowledgements associated with fragments of the data packet is discussed earlier.

Fragmenting at the TCP-level in a router 140 can be more efficient than the IP fragmentation technique employed in conventional routers for several reasons. For example, because the routing module 145 of the present invention can fragment data packets at the TCP level, the receiving host 110 can transmit an acknowledgment on a fragment-by-fragment basis. This is in contrast to IP-level fragmentation, where the IP layer at the receiving host 110 waits for all of the fragments of the data packet to arrive before providing the entire packet to the TCP layer, which then transmits an acknowledgement for the entire data packet. Thus, by fragmenting at the TCP-level in the routers 140(1-3), the present invention allows the receiving host 110 to acknowledge the receipt of individual fragments. As such, if a particular fragment is lost, the transmitting host 105 can re-transmit that one fragment as opposed to retransmitting the entire data packet. TCP fragmentation can also be more efficient than IP-level fragmentation because a TCP-level fragment causes the receiving host 110 to transmit duplicate acknowledgment(s) in the event one or more of these fragments are lost or arrive out of order (whereas no such duplicate acknowledgments are transmitted for IP-level fragments). Based on the transmitted duplicate acknowledgments, the transmitting host 110 can detect packet loss faster than conventional systems in which no such duplicate acknowledgments are transmitted for lost IP fragments.

The routers 140(1-3) of the present invention, in one embodiment, may be employed in combination with conventional routers that do not support TCP-level fragmentation. These conventional routers, upon receiving a data packet, transmit a "can't fragment" ICMP message to the transmitting host 105 upon determining that the DF flag is set and that the size of the data packet exceeds the MTU of the router. Upon receiving such a message, the transmitting host 105 may operate in the "regular" mode, as described above with reference to FIG. 7.

Figure 9:
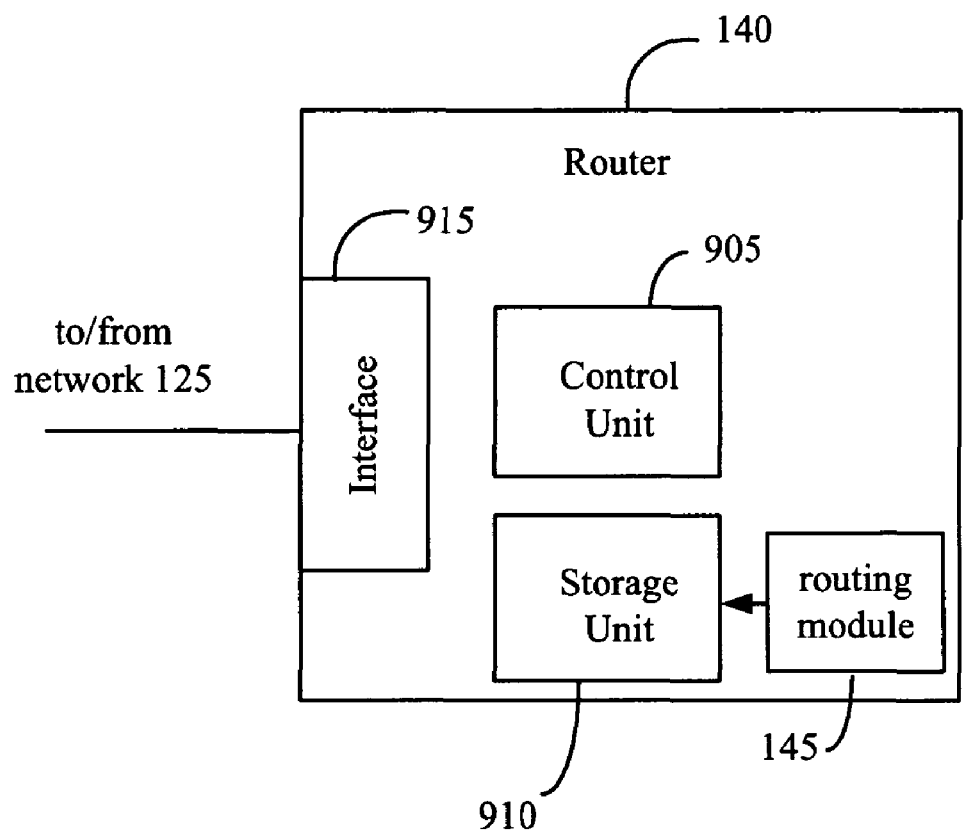
FIG. 9 depicts a block diagram of a router that may be employed in the communications system of FIG. 1, in accordance with one embodiment of the present invention.

Referring now to FIG. 9, a stylized block diagram of a router 140 that may be implemented in the communications system of FIG. 1 is illustrated, in accordance with one embodiment of the present invention. The router 140 includes a control unit 905 that is communicatively coupled to a storage unit 910, which has the routing module 145 stored therein. The control unit 905 performs overall functions for the router 140, including executing one or more module(s) stored in the storage unit 910. The router 140 includes an interface 915 that is communicatively coupled to the control unit 905. The control unit 905 communicates with other devices coupled to the network 125 via the interface 905.

Figure 10:
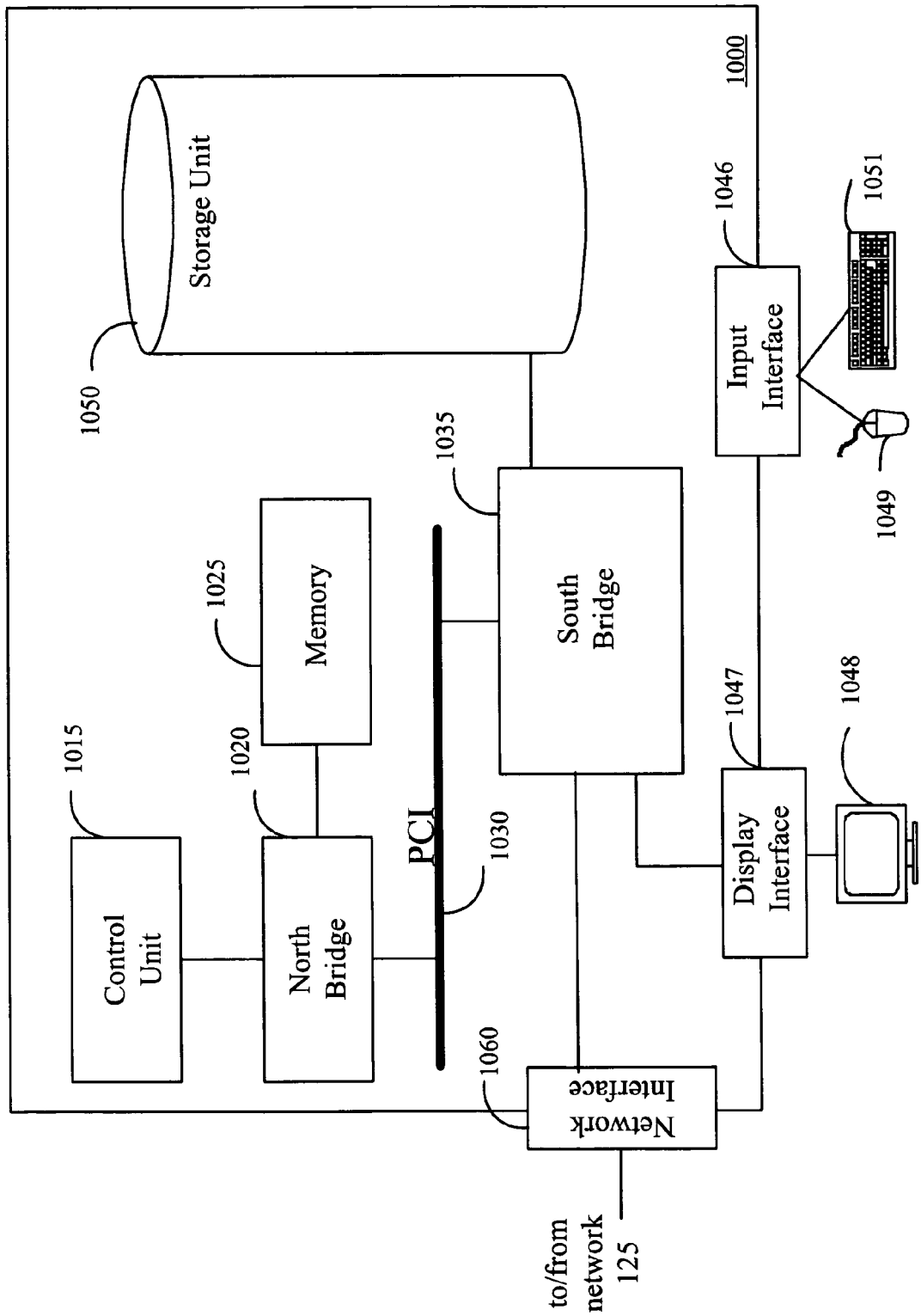
FIG. 10 illustrates a block diagram of a transmitting host and a receiving host that may be employed in the communications system of FIG. 1, in accordance with one embodiment of the present invention.

Referring now to FIG. 10, a stylized block diagram of a processor-based device 1000 that may be implemented in the communications system of FIG. 1 is illustrated, in accordance with one embodiment of the present invention. That is, the processor-based device 1000 may represent one embodiment of the transmitting host 105 or the receiving host 110. The processor-based device 1000 comprises a control unit 1015, which in one embodiment may be a processor that is capable of interfacing with a north bridge 1020. The north bridge 1020 provides memory management functions for a memory 1025, as well as serves as a bridge to a peripheral component interconnect (PCI) bus 1030. In the illustrated embodiment, the processor-based device 1000 includes a south bridge 1035 coupled to the PCI bus 1030.

A storage unit 1050 is coupled to the south bridge 1035. Although not shown, it should be appreciated that in one embodiment an operating system, such as AIX, Windows®, Disk Operating System®, Unix®, OS/2®, Linux®, MAC OS®, or the like, may be stored on the storage unit 1050 and executable by the control unit 1015. The storage unit 1050 may also include device drivers (not shown) for the various hardware components of the system 1000.

In the illustrated embodiment, the processor-based device 1000 includes a display interface 1047 that is coupled to the south bridge 1035. The processor-based device 1000 may display information on a display device 1048 via the display interface 1047. The south bridge 1035 of the processor-based device 1000 may include a controller (not shown) to allow a user to input information using an input device, such as a keyboard 1051 and/or a mouse 1049, through an input interface 1046.

The south bridge 1035 of the system 1000, in the illustrated embodiment, is coupled to a network interface 1060, which may be adapted to receive, for example, a local area network card. In an alternative embodiment, the network interface 1060 may be a Universal Serial Bus interface or an interface for wireless communications. The processor-based device 1000 communicates with other devices coupled to the network through the network interface 1060.

It should be appreciated that the configuration of the processor-based device 1000 of FIG. 10 is exemplary in nature and that, in other embodiments the processor-based device 1000 may include fewer, additional, or different components without deviating from the spirit and scope of the present invention. For example, in an alternative embodiment, the processor-based device 1000 may not include a north bridge 1020 or a south bridge 1035, or may include only one of the two bridges 1020, 1035, or may combine the functionality of the two bridges 1020, 1035. As another example, in one embodiment, the processor-based device 1000 may include more than one control unit 1015. Similarly, other configurations may be employed consistent with the spirit and scope of the present invention.

The various system layers, routines, or modules may be executable control units (such as control unit 905, 1015 (see FIGS. 9 and 10)). The control unit 905, 1015 may include a microprocessor, a microcontroller, a digital signal processor, a processor card (including one or more microprocessors or controllers), or other control or computing devices. The storage devices 910, 1050 referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices 910, 1050. The instructions when executed by a respective control unit 905, 1015 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A transmitting device, comprising:

an interface; and a control unit communicatively coupled to the interface, the control unit adapted to:

negotiate a packet size with a remote device to determine a size of data packets that is allowed to be transmitted to the remote device;

transmit a data packet of up to the negotiated size, wherein the data packet includes a transport-level protocol packet encapsulated in a network-level protocol packet, and wherein the data packet includes a flag associated with the data packet that indicates the data packet should not be fragmented; and receive acknowledgments from the remote device associated with one or more fragments of the transmitted data packet, wherein the one or more fragments are fragmented at the transport-level protocol by a network device in response to determining that the size of at least one of the transmitted data packet and a fragment of that transmitted data packet is greater than an maximum transmission unit (MTU) value.

2. The transmitting device of claim 1, wherein the control unit is further adapted to adjust a congestion window based on bytes acknowledged by the remote device.

3. A receiving device, comprising:

an interface; and a control unit communicatively coupled to the interface, the control unit adapted to:

receive two or more fragments of a data packet transmitted by a remote device, the data packet including a transport-level protocol packet encapsulated in a network-level protocol packet and a flag associated with the data packet that indicates the data packet should not be fragmented; and transmit one or more acknowledgments to the remote device based on the received fragments, wherein the fragments are fragmented at the transport-level protocol by a network device in response to determining that the size of at least one of the transmitted data packet and a fragment of the transmitted data packet is greater than an maximum transmission unit (MTU) value.

4. The receiving device of claim 3, wherein the transport-level protocol is Transmission Control Protocol (TCP), wherein the control unit is adapted to transmit acknowledgments based on the two or more of the TCP fragments.

5. The transmitted device of claim 1, wherein the transport-level protocol packet is a Transmission Control Protocol (TCP) packet and the network-level protocol packet is an Internet Protocol (IP) packet, and wherein the act of performing fragmentation comprises performing TCP fragmentation.

6. The transmitting device of claim 1, wherein transmitting the data packet of up to the negotiated size comprises transmitting the data packet of a size that substantially corresponds to a maximum segment size (MSS) negotiated between the transmitting device and a receiving device.

7. The receiving device of claim 3, wherein the transport-level protocol is Transmission Control Protocol (TCP), wherein the control unit is adapted to transmit acknowledgments based on the two or more of the TCP fragments, and wherein the network-level protocol packet is an Internet Protocol (IP) packet.

* * * * *